Figure 1:
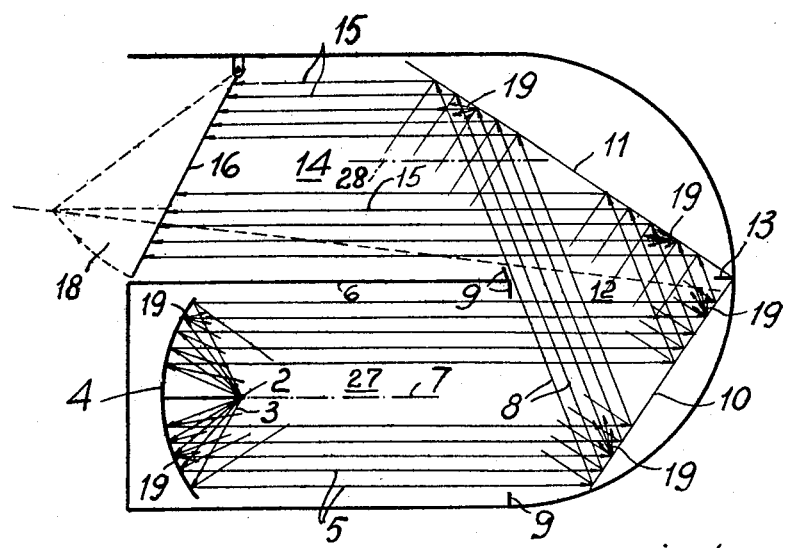

Romano NASCIMBENE
INVENTOR.

United States Patent Office 3,142,444
Patented July 28, 1964

3,142,444
VEHICLE FOG LIGHT
Romano Nascimbene, % Hotel Doriguzzi,
Via Garibaldi, Feltre, Italy
Filed Aug. 2, 1962, Ser. No. 214,325
Claims priority, application Italy Aug. 7, 1961
3 Claims. (Cl. 240—41.1)

This invention relates to an optical device adapted to generate a perfectly delimited light beam and consisting substantially of parallel rays, particularly applicable to fog lights on motor vehicles.

The principle on which all fog lights made heretofore are based is the following:

The light produced by the luminous source is partly collected by a concave mirror which delivers it through a plate glass to the surface to be illuminated. Naturally, from the light or, still better, from the plate glass of the light, starts a light beam the rays whereof are partly parallel to the optical axis and partly diverging to all directions and also upwardly.

Furthermore, what is worst, to this light ray beam, produced to enlighten a given surface, an infinite number of rays produced by the effect of diffusion is joined, which rays go onwardly in all directions and strike the fog in a very wide area and immediately ahead of the observer by creating the so-called "lightwall" which tends to annul or considerably decrease the efficient visual effect produced by other rays parallel or nearly parallel to the optical axis and directed to enlighten the desired zone.

From the above brief explanation it is clear that if one wants to see a given surface in the fog, it is necessary to produce a beam of rays which remain parallel or nearly parallel to the light optical axis of the fog light and to avoid the formation of upwardly diverging rays, it being further absolutely necessary that the diffusion effect be annulled or greatly reduced.

Motor car lights known heretofore and commercially available cannot produce, due to the principle according to which they are built, a light ray beam having the aforementioned characteristics.

It is an object of this invention to provide in particular motor car lights which, thanks to the principle on which they are based and the respective provisions, are such as to avoid the inconveniences caused by, and incidental to, the fog lights which are at present commercially available. The apparatus built according to the teachings of this invention emit a light ray beam, consisting of light rays essentially parallel to the respective optical axis; from this light ray beam specially the upwardly diverging rays are eliminated or reduced, and particularly there is a nearly total elimination or considerable reduction of the rays being harmful to the visibility which are produced by the diffusion effect.

According to this invention, provision is made for an optical system, comprising in combination a substantially point-like light source, situated in the focus of a parabolic reflecting surface fitted into a housing having optically absorbing walls, a flat reflecting member designed to collect parallel rays coming from the aforesaid parabolic surface, an annular or tubular thin wall diaphragm placed between the parabolic surface and the reflecting member, a second reflecting member having the function to complete the elimination of diffused rays and an exit deflector having an angle of incidence which can be adjusted and controlled and destined to permit the egressing of a light ray beam substantially consisting of rays parallel to the optical axis.

Figure 2:
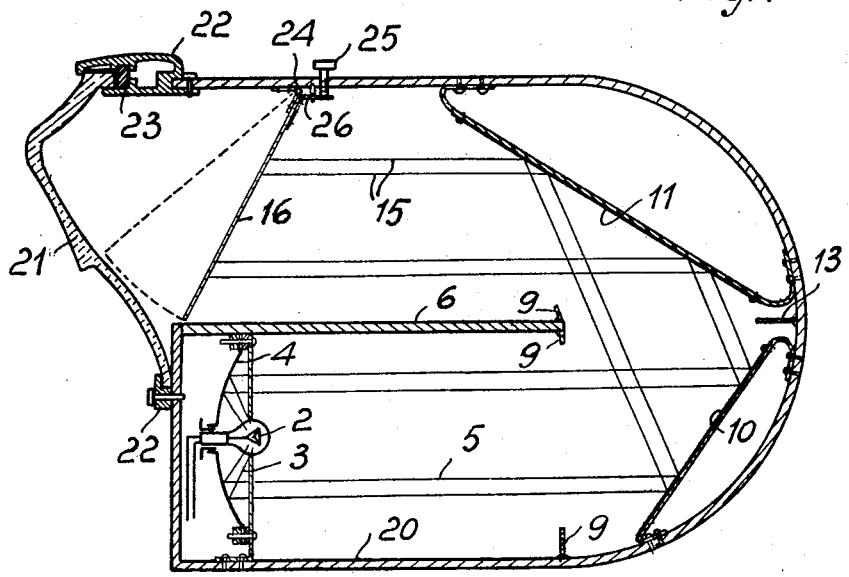

The invention will now be described with reference to the accompanying drawing which represents by way of non-restrictive example a preferred embodiment of the invention, in which:

FIG. 1 shows the functional diagram of the fog light according to the invention;

FIG. 2 diagrammatically shows a fog light embodiment according to this invention in axial longitudinal sectional view.

With reference to FIG. 1 in a tubular optical chamber 27 having an optical axis 7 and defined by an elongated tubular light absorbing wall 6 there is arranged near the closed end of said chamber 27 a suitable light source 2 placed in the focus of a concave mirror 4 which light source emits from a spot or point-like filament luminous rays 3 radiating in all directions.

A portion of these rays 3 is collected on the concave mirror 4. On the arrival of luminous rays at this concave mirror, two phenomena occur: a reflection and a diffusion phenomenon. The reflection-produced rays 5 strike a flat or plane mirror 10, whilst diffusion-produced rays 19 are spread before the concave mirror in all directions; a great many rays strike the black inner walls 6 of the housing and are, therefore, absorbed thereby, the other diffused rays striking the two flat mirrors 10 and 11 eventually rebound on the black inner walls of the housing and are, in turn, absorbed by the said black walls.

Rays 5 resulting from the regular reflections, strike, as mentioned before, mirror 10 inclined towards mirror 11, undergo another reflection and diffusion. Here, too, reflected rays 8, according to a well-known optical law, reach through the passage 12 the second flat mirror 11 in the tubular optical chamber 14 having an optical axis 28, whilst diffused rays 19 are absorbed by the black inner walls of the housing. The above mentioned reflected rays, upon striking the mirror 11, which is inclined downward or downwardly with respect to the surface to be enlightened, give still rise to reflected rays 15 and diffused rays 19. As it may be seen from FIG. 1, diffused rays are directed downwardly or towards the partition wall 6, or find their exit through the deflecting lid or obturator member 16 closed, whilst reflected rays 15, still according to the well-known optical law of reflection, are allowed to get out through the opening 18 and their exit is regulated by the lid 16. Said lid not only serves to regulate reflected rays 15 which should egress, but also regulates or prevents the passage towards the outside of rays resulting from diffusion. Said lid also serves to maintain the beam outgoing from the fog light for a remarkable distance at a desired given height, thus imparting a well-determined direction thereto, without any widening or restriction whatsoever, and preventing that any observer being outside the luminous ray beam might see the light source, that is the mirror 11 or mirror 10. Mirror 11, in this type of device, constructed according to this invention, replaces and supersedes with considerable and important advantages, due principally to its inclined position, the function which in the usual commercially available lights is accomplished by the concave mirror, which radiates directly to the outside, the beam of reflected and diffused light rays involving the well-known above-outlined defects.

It should also be emphasized that the outgoing luminous rays are parallel or nearly parallel, at least upwardly to the proper optical axis 7 of the tubular optical chamber 27. Diaphragms 9 and 13 reduce the internal passage, thereby preventing diffused rays from spraying still more.

In FIG. 2 there is diagrammatically represented a fog light constructed according to this invention. In FIG. 2 the members common to FIG. 1 are identified by the same reference number. The fog light comprises a housing 20 devided into two compartments insidely lined with black mat material of any known kind which is optically absorbent. On the front side the fog light has a shaped plate glass or pane 21 fastened to a peripheral rim 22 carrying a gasket 23. The deflecting lid 16, hinged in 24, is controlled by an adjusting screw 25 acting against a counter spring 26.

It is to be noted that since a fog light of the described kind is designed to emit a light beam with a neat and precise contour, it does not give way to dazzling phenomena if the observer's eye is only slightly displaced with respect to the beam of the emitted light, and this occurs because in this case the observer has no possibility of seeing luminous source.

It should be further observed that wall 6 with its light absorbing surfaces surrounds in a tubular manner both the beam 5 and the beam 15. In fact the central cross section of the housing may advantageously have the form of the number eight, as will be easily imagined.

This invention has been illustrated and described through preferred embodiment, but it is, of course, understood that structural changes and modifications could be practically brought about without departing from the scope of the invention itself.

What is claimed is:

1. A fog-light for motor cars, comprising a casing, a first tubular optical chamber in said casing and having an optical axis and a first tubular elongated light absorbing wall defining said first tubular optical chamber, said tubular optical chamber having a first closed end and a second closed end axially distant from said first closed end, a first reflecting plane surface at said first closed end of said first tubular optical chamber and inclined with respect to and intersecting said optical axis, a second tubular optical chamber within said casing near said first tubular optical chamber and having an optical axis parallel to the optical axis of said first tubular optical chamber and a second tubular elongated light absorbing wall defining said second tubular optical chamber, said second optical chamber having one closed end in juxtaposition with respect to said first closed end and an open end axially distant from said one closed end a second reflecting plane surface in said second tubular optical chamber near said one closed end of said second tubular optical chamber and intersecting the optical axis of said second tubular optical chamber and substantially perpendicular to said first reflecting plane surface, a reflecting parabolic concave surface in said first optical chamber near said second closed end thereof, the concavity of said reflecting parabolic concave surface being directed towards said first reflecting plane surface at said first closed end of said first optical chamber and the optical axis of said reflective parabolic concave surface coinciding with the optical axis of said first optical chamber, a light source in the focus of said reflecting parabolic concave surface, and an aperture through said first and said second tubular elongated light absorbing walls near said first and said one closed ends said aperture defining a passage from said first reflecting plane surface towards said second reflecting plane surface, a protective pane at said open end of said second optical chamber.

2. A fog-light according to claim 1, further comprising an adjustable light absorbing obturator member in said second optical chamber intermediate said pane and said second reflecting plane surface.

3. An optical device according to claim 1, wherein said first and said second tubular elongated light absorbing walls have a common wall part, said common wall part being arranged between said first and said second optical chambers.

References Cited in the file of this patent

UNITED STATES PATENTS

| | | |
|---|---|---|
| 1,406,115 | Verch | Feb. 7, 1922 |
| 1,437,161 | Sommer | Nov. 28, 1922 |
| 1,476,631 | Meisner et al. | Dec. 4, 1923 |
| 1,570,589 | McCurdy et al. | Jan. 19, 1926 |
| 1,735,725 | Borel | Nov. 12, 1929 |
| 2,185,203 | Lanoue | Jan. 2, 1940 |
| 2,539,927 | Ramminger | Jan. 30, 1951 |
| 2,701,298 | Michailovsky | Feb. 1, 1955 |